(12) United States Patent
Shiraishi

(10) Patent No.: US 7,681,678 B2
(45) Date of Patent: Mar. 23, 2010

(54) MOTORCYCLE

(75) Inventor: Takushirou Shiraishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 107 days.

(21) Appl. No.: 12/047,180

(22) Filed: Mar. 12, 2008

(65) Prior Publication Data

US 2008/0223642 A1     Sep. 18, 2008

(30) Foreign Application Priority Data

Mar. 13, 2007   (JP) .............................. 2007-064198

(51) Int. Cl.
   *B62D 61/02*   (2006.01)
(52) U.S. Cl. .................................... 180/68.3
(58) Field of Classification Search ................ 180/68.3, 180/219
   See application file for complete search history.

(56) References Cited

U.S. PATENT DOCUMENTS

| | | | | |
|---|---|---|---|---|
| 4,246,874 A | * | 1/1981 | Nakagawa et al. | 123/308 |
| 4,321,978 A | * | 3/1982 | Tominaga et al. | 180/225 |
| 6,287,354 B1 | * | 9/2001 | Nozaki | 55/385.3 |

FOREIGN PATENT DOCUMENTS

JP   2002-362464   12/2002

* cited by examiner

*Primary Examiner*—Lesley Morris
*Assistant Examiner*—Levon Fiore
(74) *Attorney, Agent, or Firm*—Keating & Bennett, LLP

(57) ABSTRACT

A motorcycle that reliably supports a load imposed on a seat while increasing charging efficiency. An intake pipe is provided in a center area in a width direction and extends rearward across and beyond an upper cross member. Left and right seat rails are provided on opposite sides of the intake pipe, and are connected to left and right main frames at portions forward of a point at which the intake pipe exceeds the upper cross member in height.

8 Claims, 8 Drawing Sheets

MOTORCYCLE

RELATED APPLICATIONS

This application claims the benefit of priority under 35 USC 119 of Japanese patent application no. 2007-064198, filed on Mar. 13, 2007, which application is hereby incorporated by reference in its entirety.

BACKGROUND OF THE INVENTION

1. Field of the Invention

The present invention relates to a motorcycle having a main frame extending rearward from a head pipe, a cross member connecting between a first frame branch and a second frame branch of the main frame, and left right seat rails extending rearward from the first and second frame branches.

2. Description of Related Art

An off-road motorcycle has an engine mounted in a cradle-type body frame, and a seat mounted in the body frame at a position above the engine.

An example of such a body frame is described in JP-A 2002-362464 and includes left and right main frames extending obliquely downward toward the rear from a head pipe, a cross member connecting between upper rear ends of the main frames, and left and right seat rails extending obliquely upward toward the rear from the main frames. An upper end of a rear cushion is connected to a bottom of the cross member, and front ends of the seat rails are connected to a top of the cross member.

In JP-A 2002-362464, an intake passage connected with an engine passes below the cross member and extends rearward and generally linearly to be connected to an air cleaner.

When an intake passage extends rearward from an engine linearly, as in this conventional motorcycle, an axis of the intake passage intersects with a cylinder axis generally perpendicularly. This structure is disadvantageous in that intake resistance is increased, thereby decreasing charging efficiency.

To decrease intake resistance, the angle formed between the axis of the intake passage and the cylinder axis may be minimized to form what is called a down-draft intake system. Such a system can be effectively built by extending the intake passage across and beyond the cross member to connect the intake passage to the engine obliquely from above.

However, to build such a system in which the intake passage extends across and beyond the cross member, the cross member must be lowered to avoid interference with a seat, and the positions at which seat rails are mounted must therefore also be lowered. This increases the distance between the seat rails and the seat, possibly causing the seat rails to fail to fully support a load imposed on the seat by a rider.

SUMMARY OF THE INVENTION

The present invention addresses these circumstances and provides a motorcycle that reliably supports a load imposed on a seat by a rider with a seat rail while reducing intake resistance.

One aspect of the invention is a motorcycle including a body frame having a main frame. The main frame extends rearward from a head pipe and is forked into a first frame branch on a left side and a second frame branch on a right side. A cross member connects between the first and second frame branches. A seat rail pair has a first seat rail extending rearward from the first frame branch and a second seat rail extending rearward from the second frame branch. An engine is mounted on the body frame and an intake system having an intake passage is connected with the engine. A seat is mounted on the first and second seat rails. The intake passage is provided at a center area in a vehicle width direction and extends rearward across and beyond the cross member. The first and second seat rails are provided on opposite sides of the intake passage in the vehicle width direction, and are connected to the first and second frame branches at portions forward of a portion of the intake passage, at which the intake passage exceeds the cross member in height.

According to the invention, because the intake passage extends rearward across and beyond the cross member, an angle formed between the axis of the intake passage and the cylinder axis can be decreased, and intake resistance is accordingly decreased to thereby increase intake charging efficiency.

According to the invention, because the first and second seat rails are connected to the first and second frame branches at portions forward of the portion of the intake passage, at which the intake passage exceeds the cross member in height, a vertical position of the seat rail pair can be elevated. Accordingly, a space between the seat and the cross member is expanded while disposing the seat directly on the seat rail pair. By utilizing the space, the intake passage can be positioned while decreasing the angle. Because the seat rail pair is thus allowed to directly support the seat, the seat rail pair reliably supports a load imposed on the seat.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
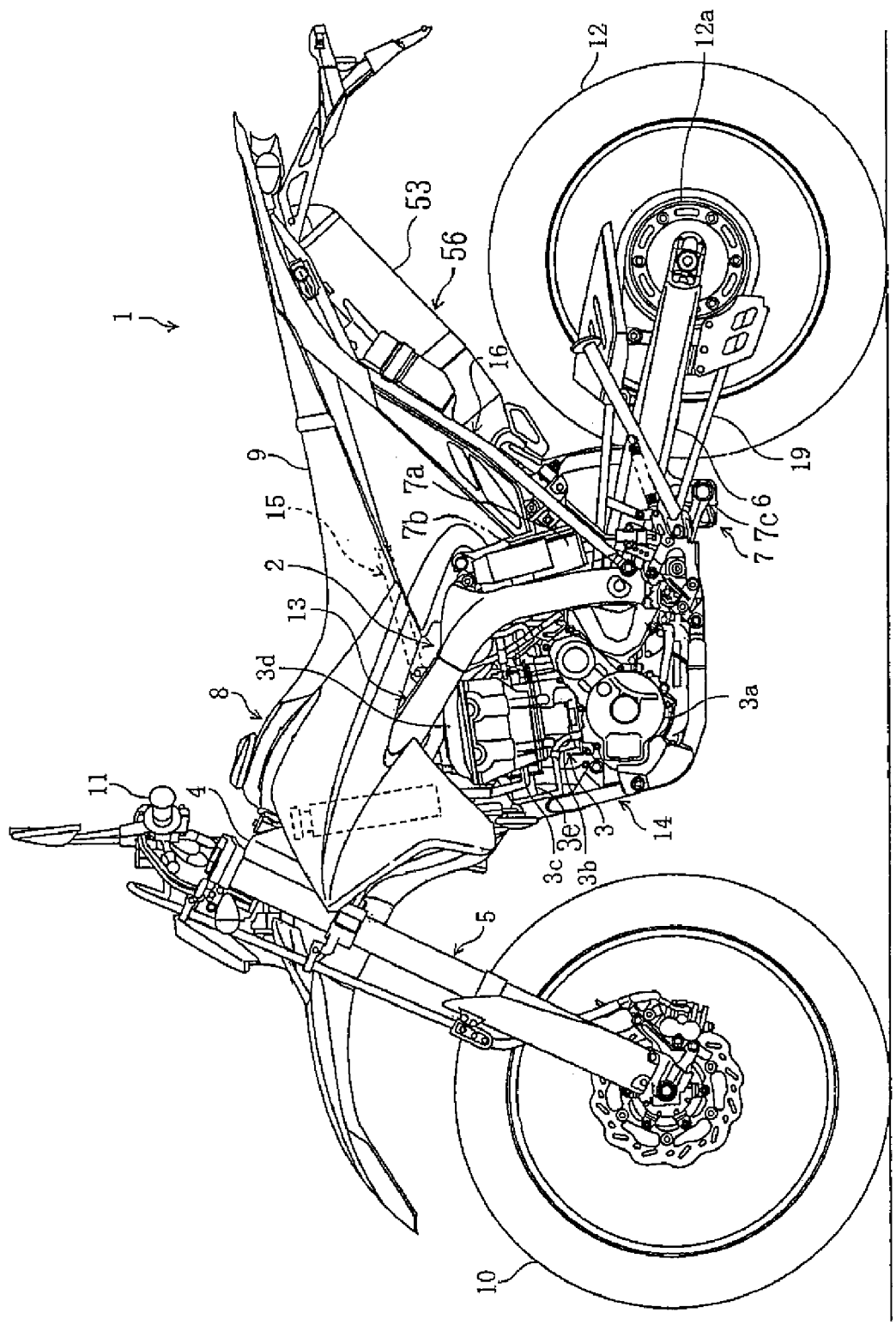
FIG. 1 is a side view of a motorcycle according to an embodiment of the present invention.
Figure 2:
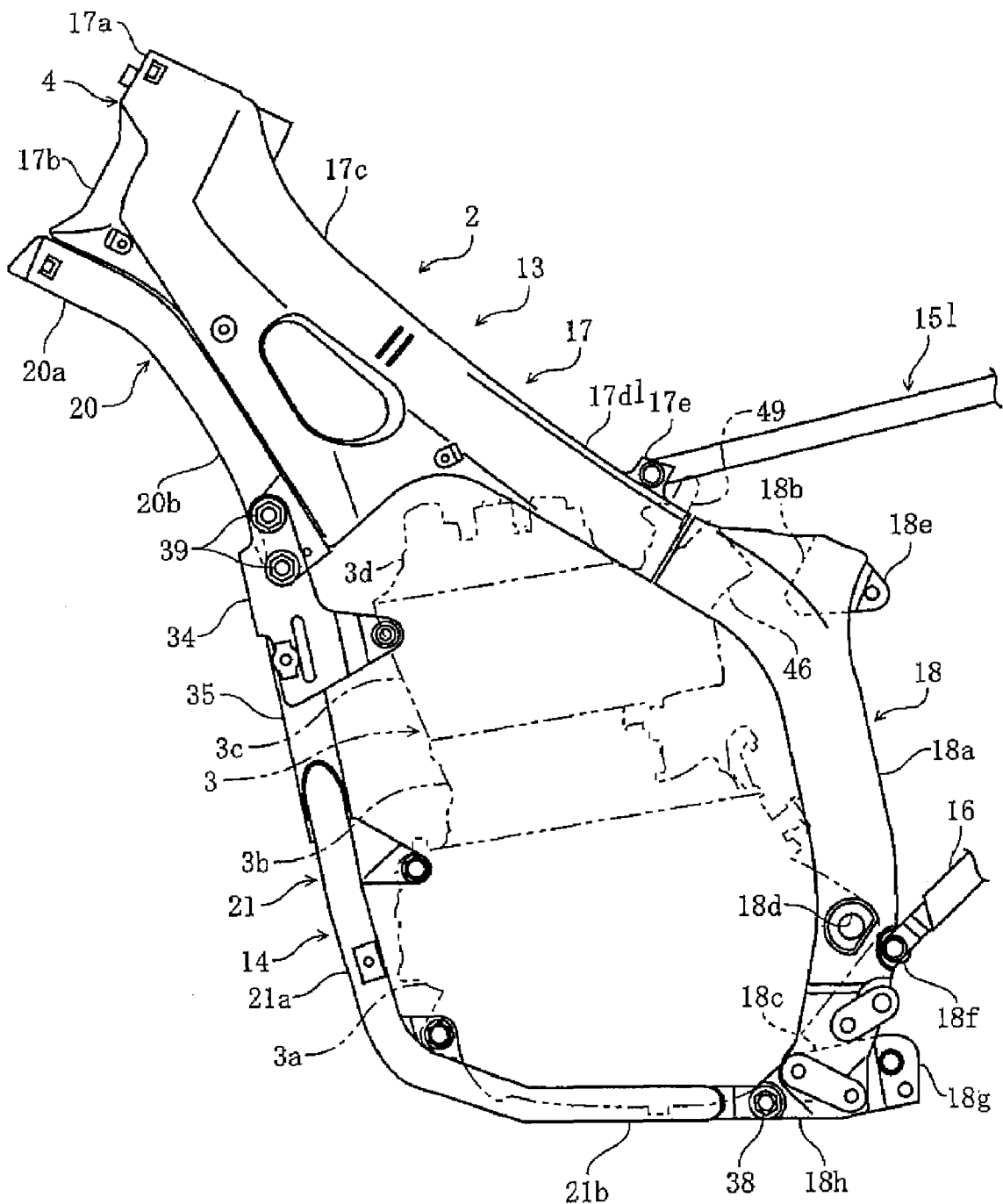
FIG. 2 is a side view of a body frame of the motorcycle.
Figure 3:
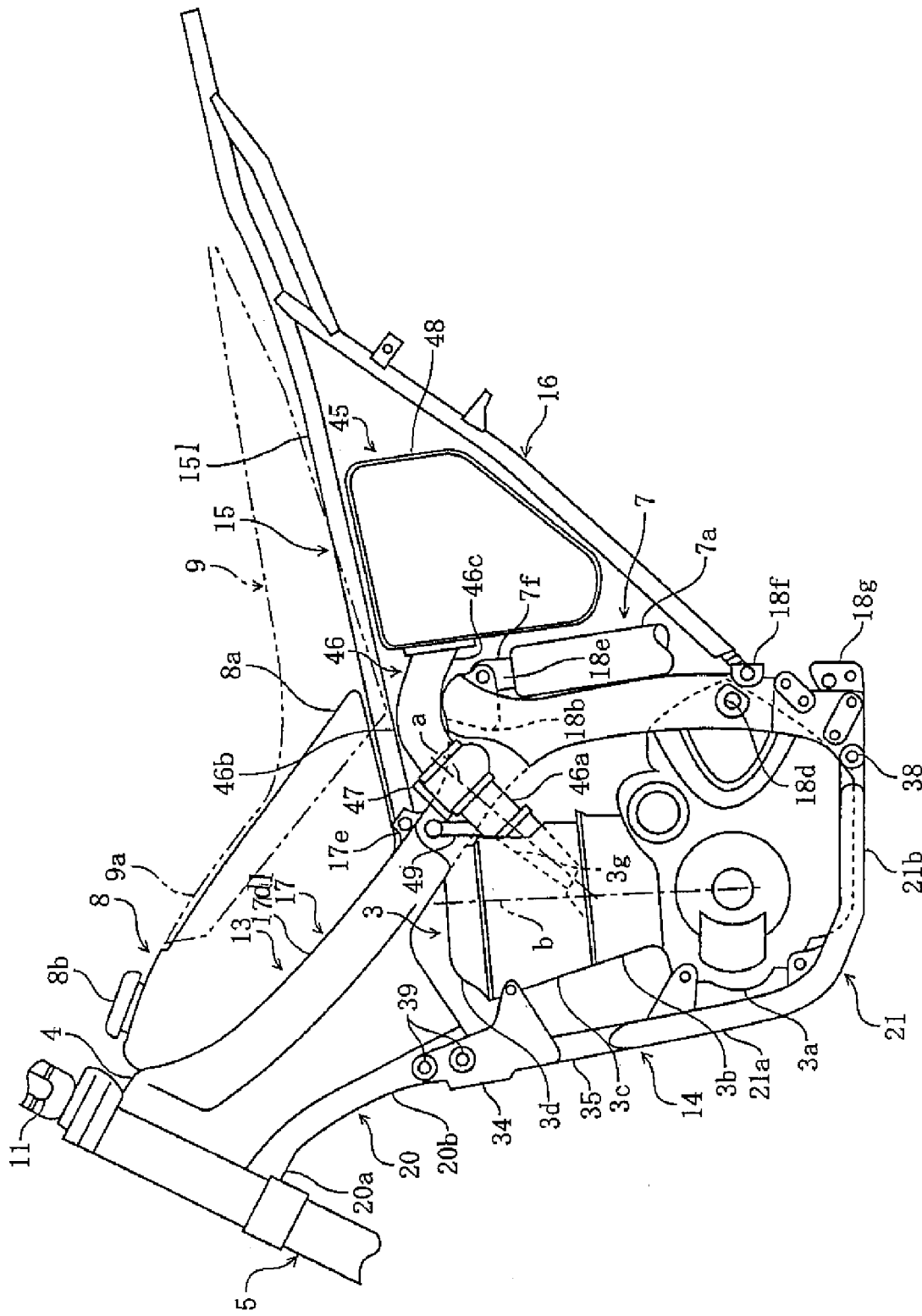
FIG. 3 is a side view of an intake system of an engine mounted on the body frame.

Embodiments of the invention are now described with reference to the drawings. FIGS. 1-8 illustrate a motorcycle 1 according to an embodiment of the invention. The terms front and rear, and left and right in the following description are from the perspective of a seated rider.

Motorcycle 1 is an off-road motorcycle including an engine 3 mounted in a cradle of a body frame 2, an intake system 45 connected with engine 3, a fuel tank 8 mounted in body frame 2 above engine 3, and a seat 9 mounted in body frame 2 behind fuel tank 8.

A front fork 5 is supported by a head pipe 4 at a front end of body frame 2 to be steered to the left and right. A rear arm 6 is vertically pivotally supported by a bottom rear end of body frame 2. A rear cushion 7 is interposed between rear arm 6 and body frame 2. A front wheel 10 is pivotally supported by a lower end of front fork 5. Steering handlebars 11 are fixed to an upper end of front fork 22. A rear wheel 12 is pivotally supported by a rear end of rear arm 6.

Body frame 2 includes a main frame 13 extending rearward from head pipe 4 and a down tube 14 located below main frame 13 and extending rearward from head pipe 4 to be connected to a bottom rear end of main frame 13.

Main frame 13 is constructed of die castings of aluminum-alloy, and has a first frame 17 and a second frame 18. First frame 17 forms a portion of head pipe 4, and extends obliquely downward toward the rear from head pipe 4. Second frame 18 is welded to a rear end of first frame 17 and extends downward therefrom.

First frame 17 includes an upper bearing 17a and a pipe body 17b, which form a portion of head pipe 4, a hollow gusset 17c, and left and right tank rails 17dl, 17dr. Gusset 17c extends rearward from pipe body 17b while being vertically widened toward the rear. Tank rails 17dl, 17dr, which are forked outward in a vehicle width direction (to the left and right) and are increasingly spaced from each other, extend rearward from gusset 17c.

Second frame 18 is welded to rear ends of tank rails 17dl and 17dr to form a unit, and includes left and right rear arm brackets 18a, an upper cross member 18b, and a lower cross member 18c. Upper cross member 18b connects between upper ends of rear arm brackets 18a, and lower cross member 18c connects between lower ends of rear arm brackets 18a.

Left tank rail 17dl and left rear arm bracket 18a form a first frame branch, which is a left branch of the invention, and right tank rail 17dr and right rear arm bracket 18a form a second frame branch, which is a right branch of the invention.

Body frame 2 includes a seat rail pair 15 and left and right seat stays 16. Seat rail pair 15 includes left and right (first and second) seat rails 15l, 15r extending obliquely upward toward the rear, respectively, from tank rails 17dl, 17dr. Seat stays 16 connect between rear ends of seat rails 15l, 15r and lower ends of rear arm brackets 18a. Seat rails 15l, 15r and seat stays 16 are cylindrical components made of iron.

Figure 8:
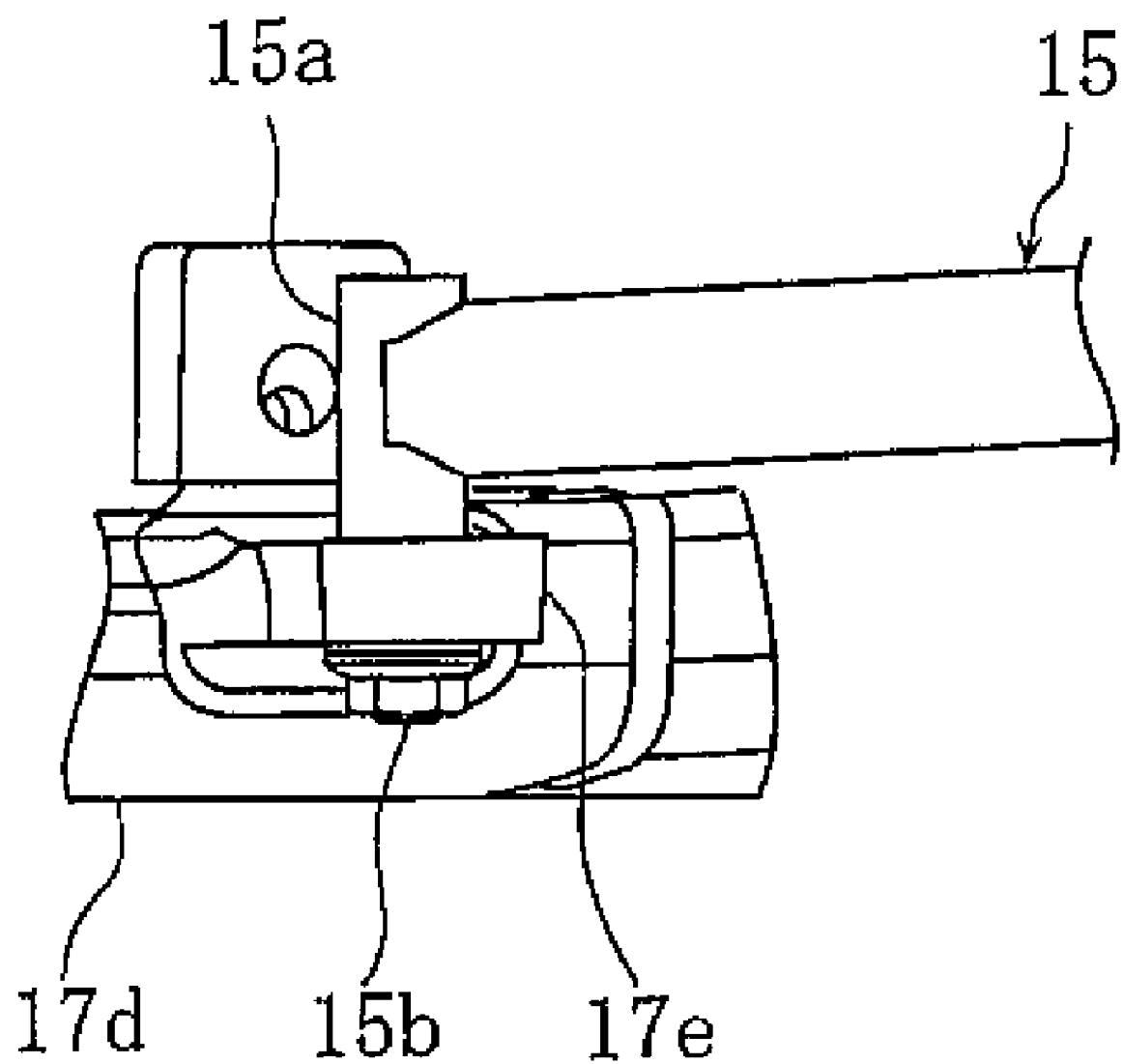
FIG. 8 is a plan view of a connecting portion between the main frame and a seat rail pair.

Seat mounting portions 17e project upward from rear ends of tank rails 17dl, 17dr. Cylindrical left and right bosses 15a, each having an axis extending along a vehicle width direction, are fixed to front ends of seat rails 15l, 15r by welding. Bosses 15a are removably fixed to insides of mounting portions 17e with connecting bolts 15b inserted from laterally outer sides (FIG. 8).

Pivot holes 18d supporting therein a pivot shaft that pivotally supports rear arm 6 are defined in lower portions of rear arm brackets 18a. Mounting portions 18f removably supporting seat stays 16 project rearward from rear arm brackets 18a at the rear of pivot holes 18d.

An upper support 18e supporting an upper end 7f of rear cushion 7 projects rearward from upper cross member 18b. Lower supports 18g supporting a lower end of rear cushion 7 project rearward from lower ends of rear arm brackets 18a.

Down tube 14 includes a first tube 20, which is a portion of head pipe 4 and extends rearward, and left and right second tubes 21 connecting between first tube 20 and the rear end of main frame 13.

First tube 20 is made of die castings of aluminum alloy, formed into a generally cylindrical shape, and has a lower bearing 20a and a lower gusset 20b. Lower bearing 20a forms a portion of head pipe 4, and lower gusset 20b extends from lower bearing 29a along a bottom face of gusset 17c. First tube 20 is welded to bottom faces of pipe body 17b and gusset 17c to form a unit.

Second tubes 21 are cylindrical components made of iron, and include oblique portions 21a extending downward from first tube 20 while being increasingly spaced from each other, and horizontal portions 21b extending generally horizontally from lower ends of oblique portions 21a toward the rear.

A square pipe 35 is welded to oblique portions 21a of second tubes 21 to form a unit A connecting bracket 34 having a C-shape in a lateral cross-sectional profile with its opening facing rearward is welded to square pipe 35 to form a unit. Connecting bracket 34 is removably connected to lower gusset 20b of first tube 20 with a pair of connecting bolts 39.

Horizontal portions 21b of second tubes 21 are removably connected to bosses 18h formed on lower ends of rear arm brackets 18a with connecting bolts 38.

Fuel tank 8 is situated along first frame 17 on a top face of first frame 17. A fuel cap 8b is reclosably mounted on a front end of fuel tank 8. A rear end portion 8a of fuel tank 8 extends through an inside of seat 9 to a portion across and beyond upper cross member 18b of seat rails 15l, 15r and is attached to seat rails 15l, 15r. A top face of fuel tank 8 is covered with a front portion 9a of seat 9.

Rear cushion 7 includes a vertically-extending shock absorber 7a provided between and at the rear of rear arm brackets 18a, a coil spring 7b surrounding an outer periphery of shock absorber 7a, and a link mechanism 7c interposed between shock absorber 7a and rear arm 6. Link mechanism 7c connects between rear arm 6 and lower supports 18g of lower cross member 18c. Upper end 7f (a vehicle body connecting portion) of shock absorber 7a is rotatably connected to upper support 18e of upper cross member 18b. A lower end of shock absorber 7a is rotatably connected to link plate 7d.

Engine 3 is a water-cooled 4-cycle single cylinder engine mounted with its cylinder axis extending generally vertically. Engine 3 is formed by stacking a cylinder block 3b, a cylinder head 3c and a head cover 3d into a unit on a crank case 3a. A rotational output of engine 3 is transmitted to a rear-wheel sprocket 12a of rear wheel 12 via a chain 19.

An exhaust system 56 is connected to engine 3. Exhaust system 56 includes an exhaust pipe 3e and a muffler 53 connected to a downstream end of exhaust pipe 3e. Exhaust pipe 3e extends rearward on a right side of the vehicle from a front wall of cylinder head 3c of engine 3 to bring cylinder head 3c into communication with an exhaust port (see FIG. 1).

Intake system 45 is connected to a rear wall of cylinder head 3c. Intake system 45 includes an intake pipe (intake passage) 46 in communication with an intake port 3g, a throttle body 47 interposed midway in intake pipe 46, and an air cleaner 48 connected to an upstream end of intake pipe 46.

A fuel injector 49 is installed in intake pipe 46 at a portion farther downstream (on a side of the engine) than throttle body 47. Fuel injector 49 induces fuel through intake port 3g and injects the fuel toward a back face of an intake valve.

Air cleaner 48 is positioned at the rear of rear cushion 7 to be accommodated in a space surrounded by left and right seat rails 15l, 15r and left and right seat stays 16.

Figure 4:
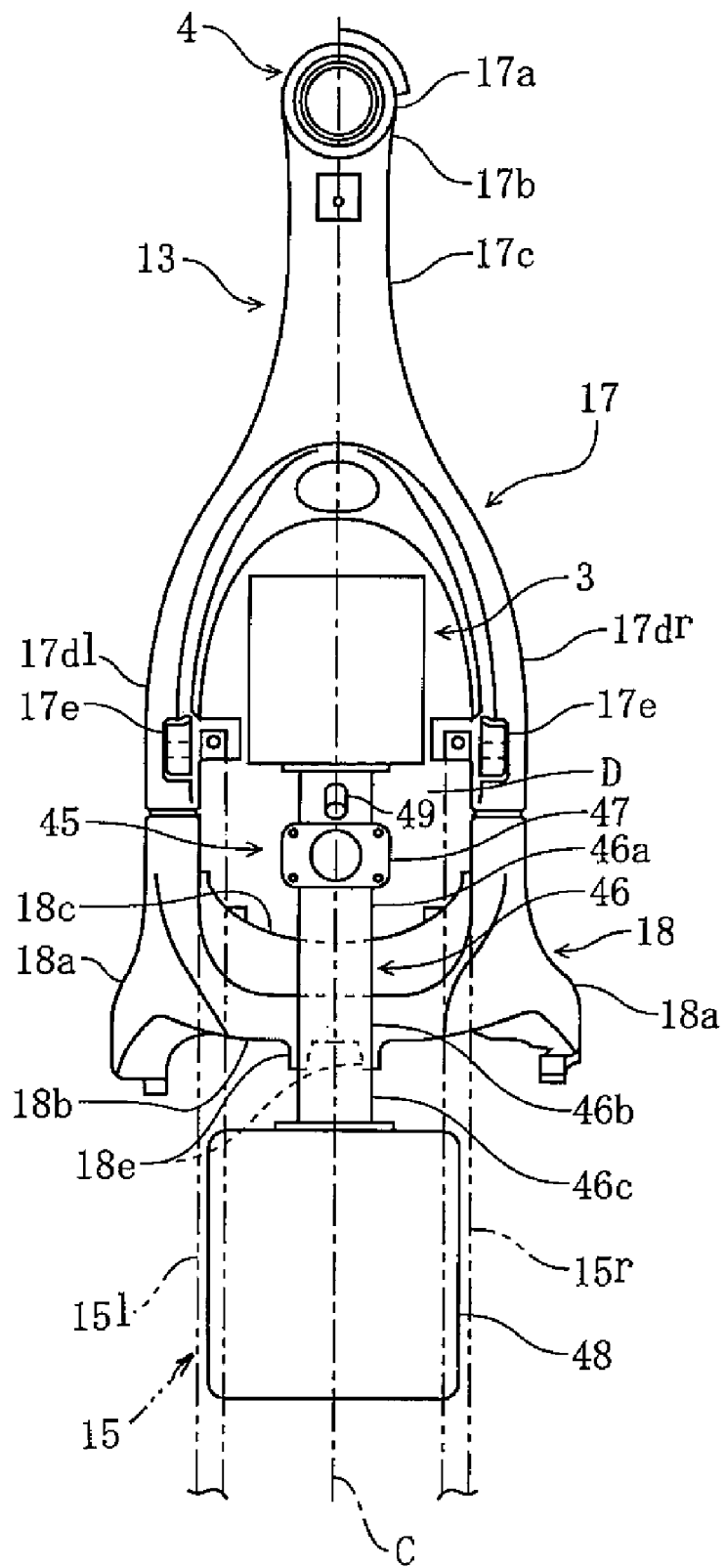
FIG. 4 is a plan view of the intake system.
Figure 5:
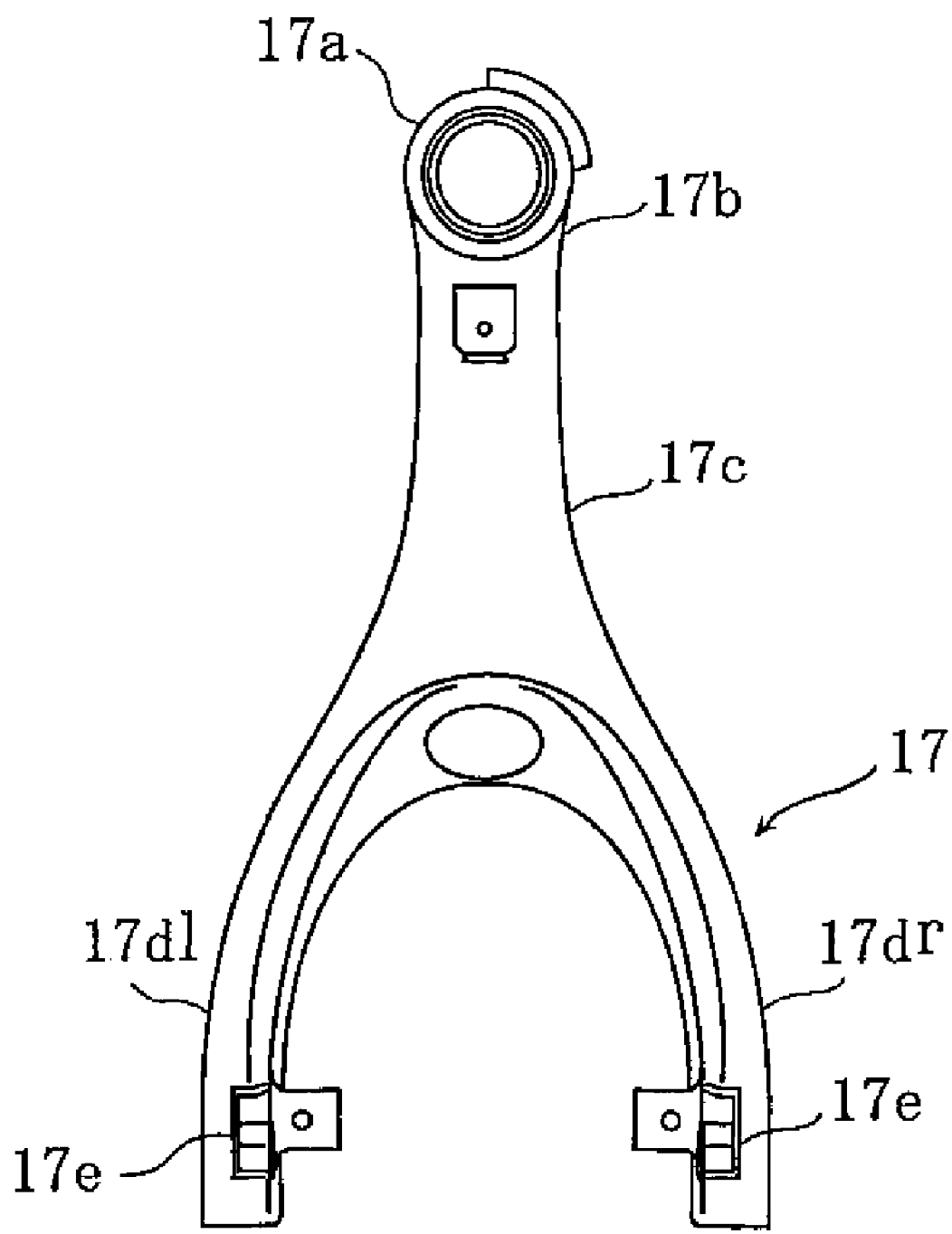
FIG. 5 is a plan view of a main frame of the body frame.
Figure 6:
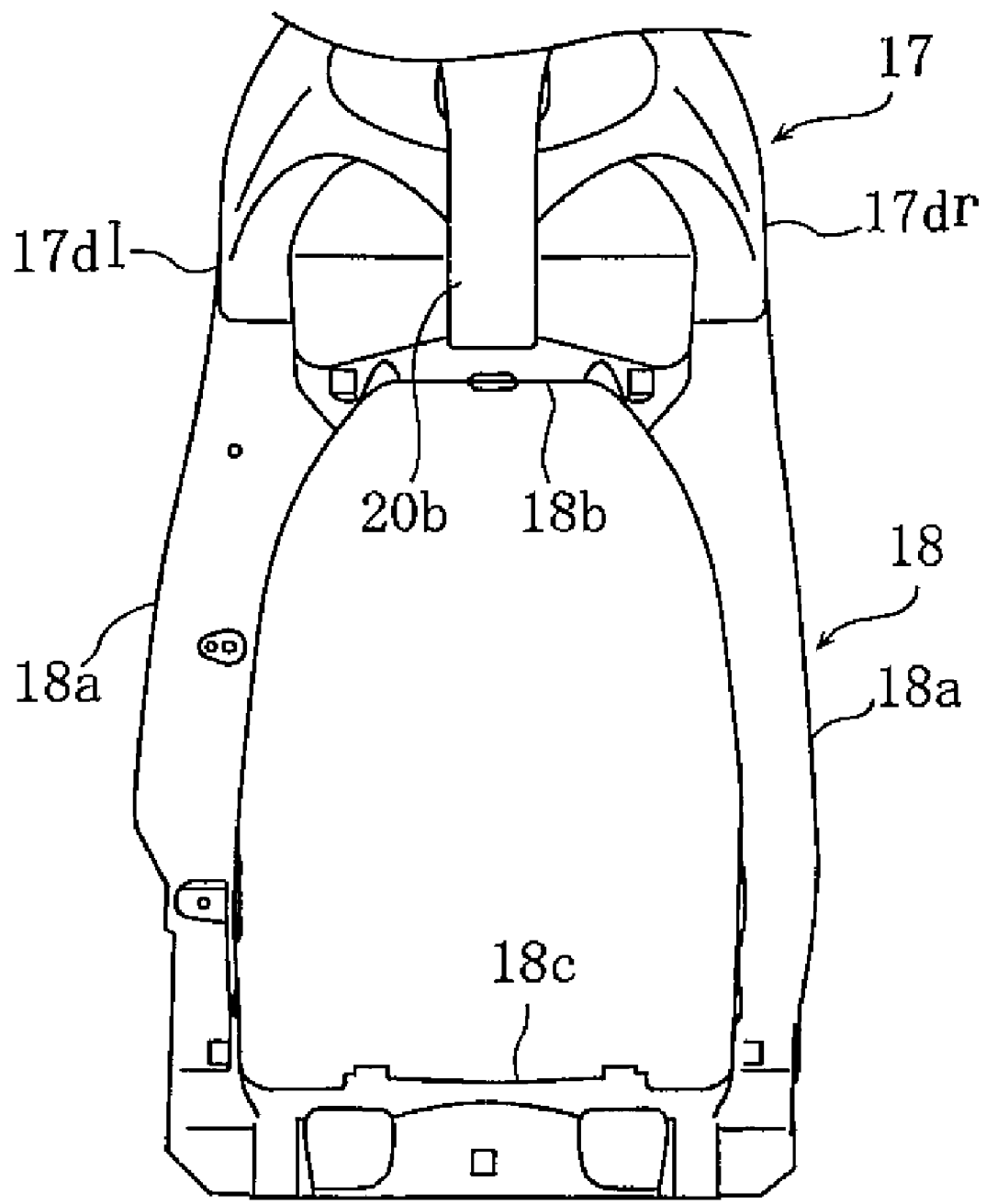
FIG. 6 is a front view of the main frame.
Figure 7:
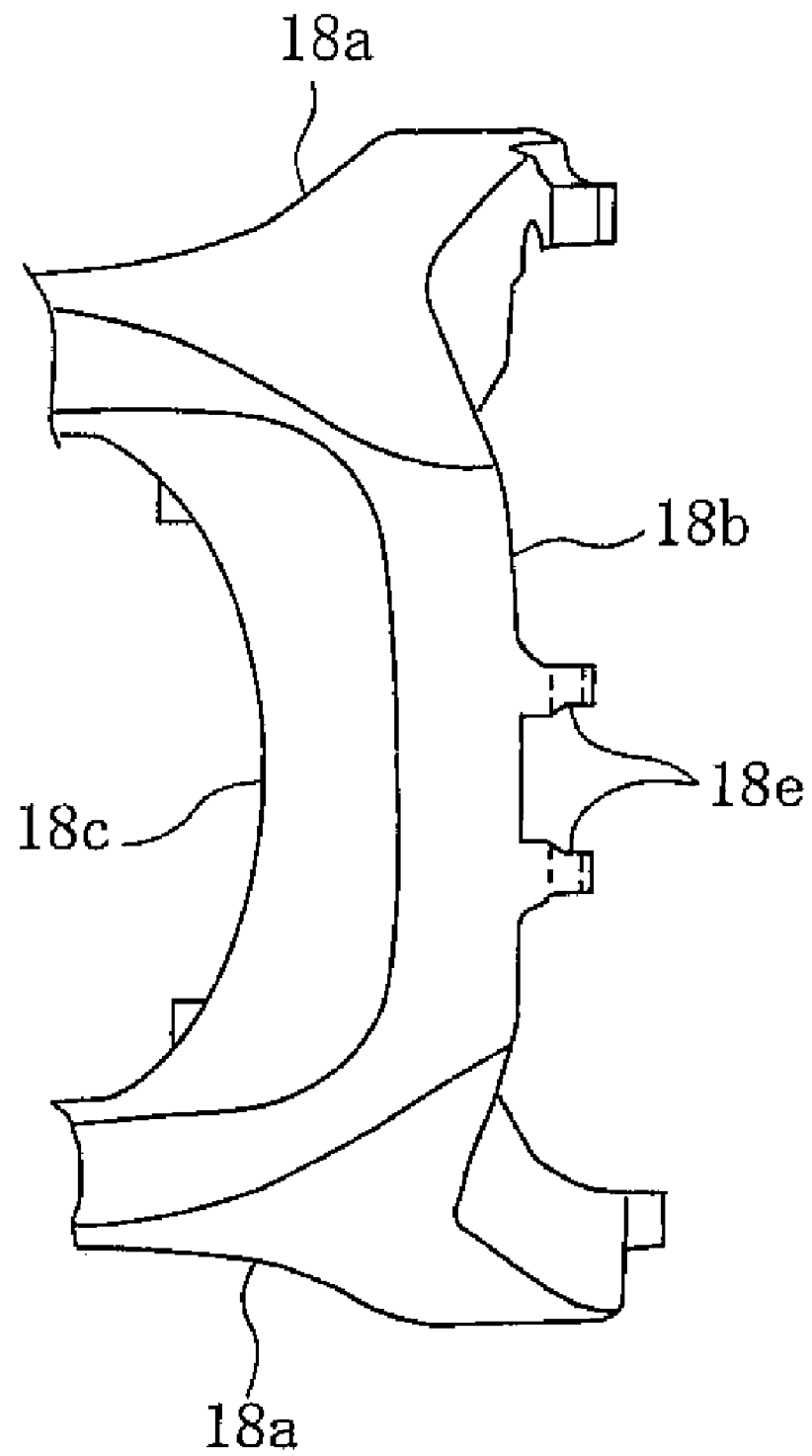
FIG. 7 is a plan view of an upper cross member of the main frame.

As viewed from above the vehicle, throttle body 47 is situated at a substantial center of an area D in main frame 13 surrounded by left and right tank rails 17dl, 17dr, left and right rear arm brackets 18a, 18a, and upper cross member 18b of main frame 13, and engine 3 (see FIG. 4).

Intake pipe 46 is situated in a center area in the vehicle width direction and extends rearward from engine 3 across and beyond upper member 17b. More specifically, intake pipe 46 is constructed as described below.

Intake pipe 46 includes a downstream portion 46a extending obliquely upward from cylinder head 3c of engine 3 toward the rear, a top portion 46b extending above upper cross member 18b from downstream portion 46a, and an upstream portion 46c extending obliquely downward behind upper cross member 18b from top portion 46b toward the rear and connected with air cleaner 48. As viewed from a side of the vehicle, intake pipe 46 has a bent shape with its summit at top portion 46b, at which intake pipe 46 exceeds upper cross member 18b in height, and descending therefrom.

Downstream portion 46a of intake pipe 46 is formed linearly such that an axis "a" of downstream portion 46a substantially overlaps with an axis of intake port 3g, and axis "a" intersects with cylinder axis "b" at an angle as small as possible. Throttle body 47 and fuel injector 49 are provided on downstream portion 46a.

Intake pipe 46 is positioned to extend between upper end 7f of rear cushion 7 and left and right seat rails 15l, 15r as viewed from a side of the vehicle, and is positioned on a vehicle-body center line C as viewed from above the vehicle. Seat rails 15l, 15r extend on left and right outer sides of intake pipe 46 and are connected to mounting portions 17e on rails 17dl, 17dr at portions forward of top portion 46b, at which intake pipe 46 exceeds upper cross member 18b in height. Bosses 15a on seat rails 15l, 15r mounted on mounting portions 17e are positioned forward of throttle body 46 and fuel injector 49.

According to this embodiment, intake pipe 46 connected to the rear wall of cylinder head 3c of engine 3 extends rearward across and beyond upper cross member 18b. Accordingly, axis "a" of intake pipe 46 and intake port 3g intersects with cylinder axis "b" at a small angle, thereby decreasing intake resistance. Consequently, intake charging efficiency is increased.

According to this embodiment, because rails 15l, 15r are connected to mounting portions 17e provided on tank rails 17dl, 17dr at portions forward of top portion 46b of intake pipe 46, a vertical position of seat rails 15l, 15r can be elevated. Accordingly, seat rail pair 15 can support seat 9 with a smaller distance between seat rail pair 15 and seat 9 or directly. Hence, seat rails 15l, 15r reliably support a load imposed by a rider on seat 9.

In this embodiment, a vertical position of cross member 18b is relatively low, upper end 7f of rear cushion 7 is connected to a lower portion of upper cross member 18b, and seat rails 15l, 15r are connected to tank rails 17dl, 17dr at portions forward of top portion 46b of intake pipe 46. Accordingly, seat 9 is spaced from upper cross member 18b while seat 9 is directly mounted on seat rail pair 15. By utilizing the space thus provided, intake pipe 46 can be situated such that axis "a" of intake pipe 46 intersects with cylinder axis "b" at a small angle, thereby decreasing intake resistance and hence increasing charging efficiency.

Furthermore, intake pipe 46 has a bent shape having its top at top portion 46b, at which intake pipe 46 exceeds upper cross member 18b in height. Accordingly, air cleaner 48 can be expanded into a space below seat 9 while causing axis "a" of downstream portion 46a of intake pipe 46 to intersect with cylinder axis "b" at a small angle. Hence, enough volume is ensured for air cleaner 48.

According to this embodiment, rear end portion 8a of fuel tank 8 is mounted on a portion of seat rails 15l, 15r that exceeds upper cross member 18b in height. Accordingly, rear end portion 8a of fuel tank 8 can be extended rearward without interfering with intake pipe 46, thereby increasing a capacity of fuel tank 8.

According to this embodiment, as viewed from above the vehicle, throttle body 47 is situated at a substantial center of the space in main frame 13 surrounded by left and right tank rails 17dl, 17dr, left and right rear arm brackets 18a, upper cross member 18b and engine 3. Accordingly, throttle body 47 can be positioned while ensuring maintainability of fuel injector 49.

Because fuel injector 49 is situated on a downstream side of throttle body 47 of intake pipe 46, a fuel injecting direction of fuel injector 49 can be oriented such that fuel is injected toward the back face of the intake valve.

While particular embodiments of the invention have been described, it should be understood that these embodiments are exemplary, and not restrictive. Various modifications will be apparent to those of skill in the art and are within the scope of the present invention as set forth in the following claims.

The invention claimed is;

1. A motorcycle comprising:
    a body frame having
        a main frame extending rearward from a head pipe and forked into a first frame branch on a left side and a second frame branch on a right side,
        a cross member connecting between the first frame branch and the second frame branch, and
        a seat rail pair, separate and distinct from the main frame, including a first seat rail connected to and extending rearward from the first frame branch and a second seat rail connected to and extending rearward from the second frame branch;
    an engine mounted on the body frame;
    an intake system having an intake passage connected with the engine; and
    a seat mounted on the first and second seat rails, wherein
    the intake passage is provided at a center area in a vehicle width direction and extends rearward above and past the cross member; and
    the first and second seat rails are provided on opposite sides of the intake passage in the vehicle width direction, and are connected to the first and second frame branches at portions forward of a top portion of the intake passage at which the intake passage extends above the cross member in a vertical direction of the motorcycle.

2. The motorcycle according to claim 1, further comprising:
    a rear arm pivotally supported by the body frame; and
    a rear cushion interposed between the rear arm and the body frame, wherein
    an upper end of the rear cushion is connected with the cross member; and
    the intake passage extends between the upper end of the rear cushion and the seat rail pair.

3. The motorcycle according to claim 1, wherein the intake passage has a bent shape, wherein the top portion of the bent shape of the intake passage extends above the cross member in the vertical direction.

4. The motorcycle according to claim 1, further comprising a fuel tank mounted on the body frame, wherein at least a portion of the fuel tank is mounted on a portion of the seat rail pair arranged above the cross member in the vertical direction.

5. The motorcycle according to claim 1, wherein, as viewed from above the motorcycle, a throttle body of the intake passage is surrounded by the first frame branch, the second frame branch, the cross member, and the engine.

6. The motorcycle according to claim 5, wherein a fuel injector is positioned closer to the engine than is the throttle body.

7. The motorcycle according to claim 1, wherein a forward portion of the intake passage located forward of the top portion of the intake passage is positioned below a location where the first seat rail is connected to the first frame branch and below a location where the second seat rail is connected to the second frame branch.

8. The motorcycle according to claim 1, further comprising a throttle body in the intake passage, wherein the throttle body is positioned below and rearward of a location where the first seat rail is connected to the first frame branch and below and reward of a location where the second seat rail is connected to the second frame branch.

* * * * *